United States Patent
Lee et al.

(10) Patent No.: US 10,427,136 B2
(45) Date of Patent: Oct. 1, 2019

(54) CATALYST FOR ALKYLATION OF POLYALKYLENE GLYCOL AND ALKYLATION METHOD USING THE SAME

(71) Applicant: NH CHEMICALS, Ulsan (KR)

(72) Inventors: Eun Ho Lee, Seoul (KR); Bongseong Go, Ulsan (KR); Taedong Kim, Ulsan (KR)

(73) Assignee: NH CHEMICALS, Ulsan (KR)

( * ) Notice: Subject to any disclaimer, the term of this patent is extended or adjusted under 35 U.S.C. 154(b) by 202 days.

(21) Appl. No.: 15/315,652

(22) PCT Filed: May 25, 2016

(86) PCT No.: PCT/KR2016/005511
§ 371 (c)(1),
(2) Date: Dec. 1, 2016

(87) PCT Pub. No.: WO2017/204378
PCT Pub. Date: Nov. 30, 2017

(65) Prior Publication Data
US 2018/0154337 A1    Jun. 7, 2018

(51) Int. Cl.
| | | |
|---|---|---|
| *B01J 21/04* | (2006.01) | |
| *B01J 19/00* | (2006.01) | |
| *B01J 27/14* | (2006.01) | |
| *B01J 37/03* | (2006.01) | |
| *B01J 37/04* | (2006.01) | |
| *B01J 37/08* | (2006.01) | |
| *C08G 65/332* | (2006.01) | |
| *C08K 5/109* | (2006.01) | |
| *C08L 23/26* | (2006.01) | |
| *B01J 27/16* | (2006.01) | |
| *C08G 65/331* | (2006.01) | |

(52) U.S. Cl.
CPC ............ *B01J 21/04* (2013.01); *B01J 19/0013* (2013.01); *B01J 27/14* (2013.01); *B01J 27/16* (2013.01); *B01J 37/031* (2013.01); *B01J 37/04* (2013.01); *B01J 37/088* (2013.01); *C08G 65/331* (2013.01); *C08G 65/332* (2013.01); *C08K 5/109* (2013.01); *C08L 23/26* (2013.01); *B01J 2208/00415* (2013.01); *B01J 2208/00557* (2013.01); *B01J 2219/00051* (2013.01); *B01J 2219/00162* (2013.01)

(58) Field of Classification Search
CPC ........ B01J 21/04; B01J 19/0013; B01J 27/14; B01J 27/16; B01J 37/031; B01J 37/04; B01J 37/088; C08G 65/331; C08G 65/332; C08K 5/109; C08L 23/26
See application file for complete search history.

(56) References Cited

U.S. PATENT DOCUMENTS

| | | | | |
|---|---|---|---|---|
| 3,328,122 A | * | 6/1967 | Kehl | ............ C01F 7/34 423/630 |
| 3,408,321 A | | 10/1968 | Ashby | |
| 3,670,030 A | * | 6/1972 | Sparks | .......... C07C 37/14 564/409 |
| 3,951,888 A | | 4/1976 | Isayama et al. | |
| 4,080,311 A | * | 3/1978 | Kehl | ............ B01J 27/16 502/208 |
| 4,587,365 A | | 5/1986 | Anchor | |

FOREIGN PATENT DOCUMENTS

EP    0302487    2/1989

OTHER PUBLICATIONS

Gooden, Peter et al., Continuous Acid-Catalyzed Methylations in Supercritical Carbon Dioxide: Comparison of Methanol, Dimethyl Ether and Dimethyl Carbonate as Methylating Agents, Organic Process Research & Development Jan. 29, 2010, vol. 14, No. 2, pp. 411-416, American Chemical Society.

Decarne, Carol et al., Thermal stability of NO2 and NO radicals formed in an Al2O3 catalyst during its pr.eparation from a nitrate precursor, Catalyst Letters, 1999, pp. 45-48, J.C. Baltzer AG, Science Publishers

* cited by examiner

*Primary Examiner* — Melvin C. Mayes
*Assistant Examiner* — Michael Forrest
(74) *Attorney, Agent, or Firm* — STIP Law Group, LLC

(57) ABSTRACT

This invention relates to a catalyst for alkylating polyalkylene glycol and a method of alkylating polyalkylene glycol using the same, wherein the catalyst enables polyalkylene glycol to be alkylated at a high conversion rate without generating harmful materials and the terminal of polyalkylene glycol can be alkylated using the same. Thereby, the terminal of polyalkylene glycol can be alkylated in an environmentally friendly and economical manner through a simple process.

15 Claims, 1 Drawing Sheet

CATALYST FOR ALKYLATION OF POLYALKYLENE GLYCOL AND ALKYLATION METHOD USING THE SAME

CROSS-REFERENCE TO RELATED APPLICATIONS

This application is the U.S. National Phase under 35 U.S.C. § 371 of International Application No. PCT/KR2016/005511 filed on Jun. 1, 2016, the disclosures of which are incorporated by reference into the present application.

TECHNICAL FIELD

The present invention relates to an alkylation catalyst, which is used to alkylate the terminal hydroxyl group of polyalkylene glycol at a high conversion rate, and to a method of alkylating the terminal of polyalkylene glycol, in which polyalkylene glycol is alkylated in an environmentally friendly and economical manner in the presence of the alkylation catalyst.

BACKGROUND ART

Polyalkylene glycol (PAG) is a kind of synthetic lubricant oil resulting from the polymerization of an alcohol, serving as a starting material, by the addition of ethylene oxide or propylene oxide, and is configured to have a hydroxyl group (—OH) or an alkyl group at the terminal thereof.

Such polyalkylene glycol has already been commercialized as refrigeration oil for air conditioners for vehicles by Idemitsu Kosan (Japan) and the like, and is sold in the global automotive OEM industry and on secondary markets.

However, polyalkylene glycol having a terminal hydroxyl group (—OH) has a high ability to absorb water in the air due to the hydroxyl group (—OH) during its use as refrigeration oil in air conditioners, and thus its freezing point is increased by the water absorbed to the refrigeration oil, and parts of the air conditioners may corrode. With the goal of solving the above problem, attempts have been made to substitute the terminal hydroxyl group of polyalkylene glycol with an alkyl group.

A conventional technique for alkylating the terminal hydroxyl group (—OH) of polyalkylene glycol with a methyl group is known to be a method of alkylating the terminal of polyalkylene glycol with a methyl group using, as an alkylating agent, a methyl halide such as $CH_3Cl$, $CH_3I$ or the like (U.S. Pat. No. 4,587,365). However, this method is environmentally disadvantageous because the acid generated during the reaction has to be neutralized with a neutralizing agent and the resultant salt has to be removed, and the reaction itself is slow and completion of the reaction may become problematic. Furthermore, $CH_3Cl$, $CH_3I$, etc., used as the alkylating agent, are materials that are known to strongly influence global warming potential or that are expensive and hazardous, and thus the practical application thereof is limited.

Also, European Patent Publication No. 0302487 discloses a method of alkylating the terminal of polyalkylene glycol with a methyl group using methyl sulfate as an alkylating agent, in which the reaction is faster than when using methyl halide as an alkylating agent, but methyl sulfate is also known to be a hazardous material and is thus regarded as environmentally unfriendly.

Furthermore, methods of introducing an allyl group to the terminal hydroxyl group (—OH) of polyalkylene glycol (U.S. Pat. Nos. 3,408,321 and 3,951,888) are available, but are characterized by high cost and low reaction rate, making it difficult to achieve practical application thereof.

DISCLOSURE

Technical Problem

Accordingly, the present invention has been made keeping in mind the above problems encountered in the related art, and the present invention is intended to provide a catalyst for alkylating the terminal of polyalkylene glycol and a method of preparing the same, in which polyalkylene glycol may be alkylated in an environmentally friendly and economical manner at a high conversion rate.

In addition, the present invention is intended to provide a method of alkylating the terminal of polyalkylene glycol, in which polyalkylene glycol may be alkylated in an environmentally friendly and economical manner at a high conversion rate using the above catalyst.

Technical Solution

An embodiment of the present invention provides a catalyst for alkylating the terminal of polyalkylene glycol, suitable for alkylating the terminal of polyalkylene glycol by reacting polyalkylene glycol with an alkylating agent, the catalyst comprising alumina.

In a preferred embodiment of the present invention, the alumina is eta-alumina, gamma-alumina, or a mixture comprising eta-alumina and gamma-alumina.

In a preferred embodiment of the present invention, the alkylating agent is dialkyl carbonate.

In a preferred embodiment of the present invention, the catalyst is an alumina-aluminum phosphate catalyst further comprising aluminum phosphate.

In a preferred embodiment of the present invention, in the alumina-aluminum phosphate catalyst, alumina is contained in an amount ranging from 13 wt % to less than 100 wt % based on the total weight of the catalyst.

Another embodiment of the present invention provides a method of preparing an alumina catalyst, suitable for use in alkylating the terminal of polyalkylene glycol, comprising: (a) adding a precipitant to a first alumina precursor aqueous solution, thus forming aluminium hydroxide; and (b) drying and then calcining the aluminium hydroxide.

Still another embodiment of the present invention provides a method of preparing an alumina-aluminum phosphate catalyst comprising the above alumina catalyst and aluminum phosphate, suitable for use in alkylating the terminal of polyalkylene glycol, comprising: (a-1) adding a precipitant to a first alumina precursor aqueous solution, thus forming aluminium hydroxide; (a-2) mixing a second alumina precursor aqueous solution and a phosphate precursor and then adding a precipitant, thus forming aluminum phosphate hydroxide; (a-3) mixing the aluminium hydroxide of (a-1) with the aluminum phosphate hydroxide of (a-2) to give a hydroxide mixture, which is then added with a precipitant, thus forming an alumina-aluminum phosphate-mixed hydroxide; and (b) drying and then calcining the alumina-aluminum phosphate-mixed hydroxide.

In a preferred embodiment of the present invention, the first alumina precursor or the second alumina precursor is independently at least one selected from the group consisting of aluminum nitrate, sodium aluminate, potassium aluminate, aluminum chloride, aluminum sulfate, aluminum acetate, aluminum alkoxide, and trimethylaluminum.

In a preferred embodiment of the present invention, the phosphate precursor is at least one selected from the group consisting of phosphoric acid, orthophosphate, pyrophosphate, polyphosphate, metaphosphate, ultraphosphate, diammonium hydrophosphate, and ammonium dihydrophosphate.

In a preferred embodiment of the present invention, the phosphate precursor of (a-2) is mixed in an amount of 0.77 to 1.53 mol based on 1 mol of the second alumina precursor.

In a preferred embodiment of the present invention, the precipitant is independently at least one selected from the group consisting of aqueous ammonia, sodium hydroxide, ammonium hydroxide, sodium carbonate, calcium carbonate, and ammonium carbonate.

In a preferred embodiment of the present invention, the precipitant is added in the form of an aqueous solution.

In a preferred embodiment of the present invention, the precipitant is added until the pH of the precursor aqueous solution is within the range from 9 to 11.

In a preferred embodiment of the present invention, (b) comprises performing drying at 90 to 150° C. for 15 to 30 hr and calcining at 500 to 700° C. for 5 to 30 hr.

In a preferred embodiment of the present invention, the aluminum phosphate hydroxide of (a-3) is mixed in an amount of 0 to 5.9 mol based on 1 mol of the aluminum hydroxide.

Yet another embodiment of the present invention provides a method of alkylating the terminal of polyalkylene glycol, comprising reacting an alkylating agent and polyalkylene glycol at a temperature ranging from 120 to 170° C. under a pressure ranging from atmospheric pressure to 3 kgf/cm$^2$ in the presence of the above catalyst so as to alkylate the terminal of polyalkylene glycol.

In a preferred embodiment of the present invention, the alkylating agent is dialkyl carbonate.

In a preferred embodiment of the present invention, the alkylating agent is reacted in an amount of 10 to 40 mol based on 1 mol of the polyalkylene glycol.

Advantageous Effects

According to the present invention, an alkylation catalyst for alkylating the terminal of polyalkylene glycol at a high conversion rate without generating harmful materials and a method of preparing the same can be provided, and the terminal of polyalkylene glycol can be alkylated using the above catalyst. Thereby, the terminal of polyalkylene glycol can be alkylated in an environmentally friendly and economical manner through a simple process, making it possible to apply the present invention to a variety of fields including refrigeration oil for air conditioners for vehicles.

BEST MODE

Figure 1:
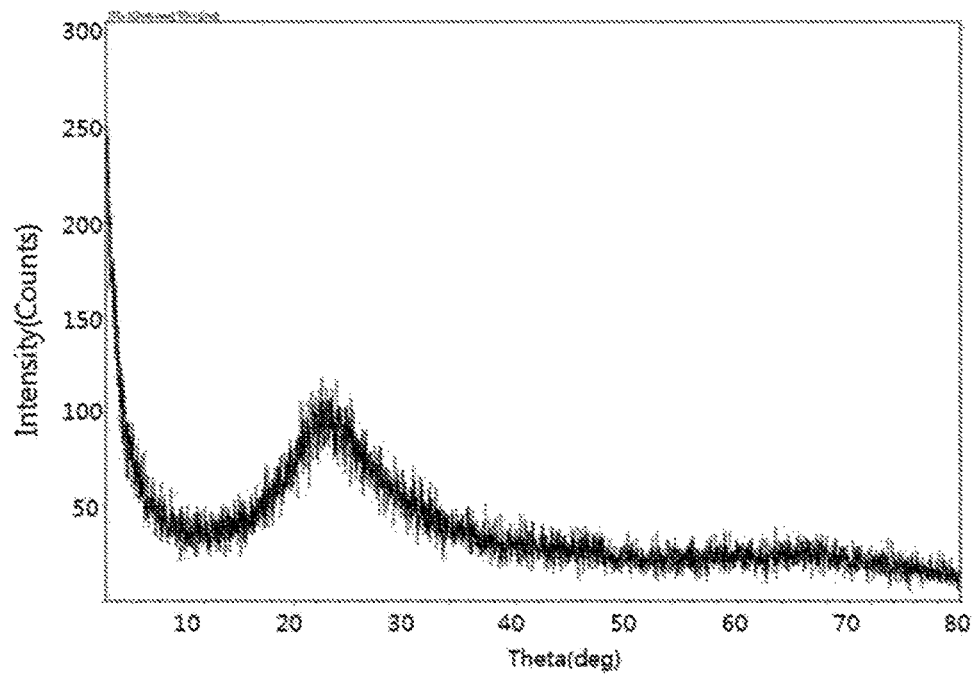
FIG. 1 is a graph showing the results of analysis of X-ray diffraction (XRD) of the catalyst of Preparation Example 1 according to the present invention.

Unless defined otherwise, all of the technical or scientific terms used herein have the same meanings as those typically understood by persons having ordinary knowledge in the art to which the present invention belongs. Generally, the nomenclature used herein is well known in the art and is typical.

As used herein, when any part "includes" any element, this means that another element is not excluded but may be further included unless otherwise specifically mentioned.

An aspect of the present invention addresses a catalyst for alkylating the terminal of polyalkylene glycol by reacting polyalkylene glycol and an alkylating agent, the catalyst including alumina.

More specifically, the catalyst for alkylating the terminal of polyalkylene glycol according to the present invention enables the terminal of polyalkylene glycol to be alkylated at a high conversion rate using dialkyl carbonate as an environmentally friendly alkylating agent.

Any polyalkylene glycol may be used so long as its terminal has a hydroxyl group that is substituted, and examples thereof may include polyether polyol, allyl alcohol, alkylene oxide adducts, etc.

The alkylating agent may be dialkyl carbonate such as dimethyl carbonate, diethyl carbonate, ethylmethyl carbonate, dipropyl carbonate, and methyl propyl carbonate. Preferably useful is dimethyl carbonate or diethyl carbonate.

The catalyst for alkylating the terminal of polyalkylene glycol includes alumina, and the alumina preferably includes eta-alumina, gamma-alumina, or a mixture of eta-alumina and gamma-alumina.

Also, the alumina catalyst may further include aluminum phosphate. As such, when the amount of aluminum phosphate is less than 87 wt %, ideal catalytic performance may result.

The catalyst for alkylating polyalkylene glycol according to the present invention enables the alkylation of polyalkylene glycol without generating harmful materials, and may thus be environmentally friendly utilized in various fields, including as refrigeration oil for air conditioners for vehicles, etc.

Another aspect of the present invention addresses a method of preparing a catalyst for alkylating the terminal of polyalkylene glycol, comprising (a) adding a precipitant to a first alumina precursor aqueous solution to form aluminium hydroxide, and (b) drying and then calcining the formed aluminium hydroxide, and also addresses a catalyst for alkylating the terminal of polyalkylene glycol, prepared by the above method.

Below is a description of steps of the method of preparing the catalyst for alkylating the terminal of polyalkylene glycol according to the present invention.

In the method of preparing the catalyst for alkylating the terminal of polyalkylene glycol according to the present invention, a precipitant is added to a first alumina precursor aqueous solution, thus forming first aluminium hydroxide [step (a)].

The first alumina precursor aqueous solution contains 5 to 60 parts by weight of the first alumina precursor based on 100 parts by weight of distilled water. If the amount of the first alumina precursor is less than 5 parts by weight based on 100 parts by weight of distilled water, the efficiency of catalyst production may decrease because the amount of the first alumina precursor is too low. On the other hand, if the amount thereof exceeds 60 parts by weight, a long period of time is required in order to dissolve the first alumina precursor at room temperature, or a portion of the first alumina precursor may not be dissolved, but may precipitate. If precipitation progresses during the reaction with the precipitant, excess solids may be formed, making it difficult to perform stirring using a stirrer.

The first alumina precursor is not particularly limited so long as it is typically useful in the art, and examples thereof may include aluminum nitrate, sodium aluminate, potassium aluminate, aluminum chloride, aluminum sulfate, aluminum acetate, aluminum alkoxide, and trimethylaluminum.

The precipitant may be used without limitation so long as it is a compound able to form aluminium hydroxide by precipitating the first alumina precursor, and examples thereof preferably include basic compounds, such as aqueous ammonia, sodium hydroxide, ammonium hydroxide, sodium carbonate, calcium carbonate, ammonium carbonate, and urea. Preferably useful is aqueous ammonia or sodium hydroxide.

The precipitant is preferably added until the pH of the first alumina aqueous solution falls in the range from 9 to 11. In the case where an excess of precipitant is added to the precursor aqueous solution and thus the pH exceeds the above upper limit, the number of catalyst base sites is excessively increased, and thus reactivity may decrease. On the other hand, if the pH is below the above lower limit, aluminium hydroxide may not be sufficiently formed due to the insufficient concentration of the precipitant.

The aluminium hydroxide thus formed may be additionally separated from the solution using any technique that is well-known in the art, which may include, for example, filtration, decantation, evaporation, washing, drying and spray drying, and preferably includes at least one of filtration, washing and spray drying. In the case where a catalyst support or structure is coated therewith, coating and drying may be performed after washing, or coating may be performed after calcination, as will be described later.

The aluminium hydroxide thus obtained is dried and then calcined to form a catalyst for alkylating the terminal of polyalkylene glycol, which is in oxide form, such as alumina [step (b)].

The aluminium hydroxide may be dried at 90 to 150° C. for 15 to 30 hr, and may then be calcined through heating at a high temperature under an oxidizing atmosphere using air or an oxygen-containing gas mixture.

Calcination may be performed at 500 to 700° C. for 5 to 30 hr. If the calcination conditions fall out of the above conditions, the desired form of catalyst may not be obtained, and the resulting catalyst may have activity unsuitable for the alkylation of polyalkylene glycol.

The alkylation catalyst according to the present invention may further include aluminum phosphate.

The method of preparing the catalyst further including aluminum phosphate is described below.

This method includes the steps of (a-1) adding a first alumina precursor aqueous solution with a precipitant, thus forming aluminium hydroxide, (a-2) mixing a second alumina precursor aqueous solution and a phosphate precursor and then adding a precipitant, thus forming aluminum phosphate hydroxide, (a-3) mixing the aluminium hydroxide of (a-1) with the aluminum phosphate hydroxide of (a-2) to give a hydroxide mixture and then adding a precipitant, thus forming an alumina-aluminum phosphate-mixed hydroxide, and (b) drying and then calcining the alumina-aluminum phosphate-mixed hydroxide.

Also, the steps of the method of preparing the catalyst for alkylating polyalkylene glycol according to the present invention are specified below.

In the method of preparing the catalyst for alkylating polyalkylene glycol according to the present invention, a first alumina precursor aqueous solution is added with a precipitant, thus forming first aluminium hydroxide [step (a-1)]. As such, forming the first aluminium hydroxide in step (a-1) is the same as above, and a description thereof is omitted.

Next, a second alumina precursor aqueous solution and a phosphate precursor are mixed and then added with a precipitant, thus forming aluminum phosphate hydroxide [step (a-2)].

The second alumina precursor aqueous solution includes the second alumina precursor dissolved in distilled water, and the amount of the second alumina precursor is 1 to 40 parts by weight based on 100 parts by weight of distilled water. If the amount of the second alumina precursor is less than 1 part by weight based on 100 parts by weight of distilled water, the efficiency of catalyst production may decrease because the amount of the second alumina precursor is too low. On the other hand, if the amount thereof exceeds 40 parts by weight, a long period of time is required to dissolve the second alumina precursor at room temperature, or a portion of the second alumina precursor may not be dissolved, but may precipitate. If precipitation occurs during the reaction between the second alumina precursor and the precipitant, excess solids may be formed, making it difficult to perform stirring using a stirrer.

The second alumina precursor may be the same as or different from the first alumina precursor, and examples thereof may include aluminum nitrate, sodium aluminate, potassium aluminate, aluminum chloride, aluminum sulfate, aluminum acetate, aluminum alkoxide, and trimethyl aluminum.

Also, the phosphate precursor may include, but is not limited to, phosphoric acid, orthophosphate, pyrophosphate, polyphosphate, metaphosphate, ultraphosphate, diammonium hydrophosphate, and ammonium dihydrophosphate, and such a salt may contain calcium, sodium, iron, or potassium.

For the mixing ratio of the phosphate precursor to the second alumina precursor, the molar ratio (P/Al molar ratio) of aluminum (Al) based on 1 mol of phosphor (P) falls in the range of 0.77 to 1.53. If the molar ratio thereof is less than 0.77, the reaction of the second alumina precursor into alumina phosphate does not sufficiently occur due to the low concentration of the phosphate precursor. On the other hand, if the molar ratio thereof exceeds 1.53, the precipitant may be excessively used due to an excess of phosphate.

The precipitant used for the mixture of the second alumina precursor aqueous solution and the phosphate precursor may be the same as or different from the precipitant used for forming aluminium hydroxide, and is preferably added until the pH of the precursor aqueous solution comprising the second alumina precursor aqueous solution and the phosphate precursor, which are mixed, falls in the range of 9 to 11. In the case where an excess of precipitant is added to the precursor aqueous solution and thus the pH thereof exceeds the above upper limit, reactivity may decrease. On the other hand, if the pH is below the above lower limit, aluminum phosphate hydroxide is not sufficiently formed due to the insufficient concentration of the precipitant.

The aluminium hydroxide and the aluminum phosphate hydroxide, which are respectively precipitated with precipitants, are mixed, and the resulting hydroxide mixture is further added with a precipitant, thus forming an alumina-aluminum phosphate-mixed hydroxide [step (a-3)].

As such, the aluminum phosphate hydroxide may be mixed in an amount of 0 to 5.9 mol, and preferably 0.01 to 5.9 mol, based on 1 mol of the aluminium hydroxide.

If the aluminum phosphate hydroxide is added in an amount exceeding 5.9 mol based on 1 mol of the aluminium hydroxide, side-reaction materials may be excessively formed. On the other hand, if the aluminum phosphate hydroxide is mixed at 0 mol, only alumina is formed in subsequent drying and calcining. In this case, step (b) may be performed directly after (a-1), without the need for steps (a-2) and (a-3).

The precipitant may be the same as or different from the precipitant that is used when forming the aluminium hydroxide and the aluminum phosphate hydroxide. In order to obtain a fine and uniform precipitate, the precipitant is preferably added in the form of an aqueous solution, and more preferably, an aqueous solution thereof is added while stirring the precursor aqueous solution.

The precipitant is added until the pH of the hydroxide mixture comprising aluminium hydroxide and aluminum phosphate hydroxide falls in the range of 9 to 11, thereby precipitating the alumina-aluminum phosphate-mixed hydroxide. If the pH of the hydroxide mixture comprising aluminium hydroxide and aluminum phosphate hydroxide is lower than 9, the hydroxide may not be sufficiently precipitated. On the other hand, if the pH thereof exceeds 11, reactivity may decrease due to the excessive increase in the number of base sites.

The alumina-aluminum phosphate-mixed hydroxide thus obtained may be additionally separated from the solution by means of any technique well-known in the art, which may include, for example, filtration, decantation, evaporation, washing, drying and spray drying, and preferably includes at least one of filtration, washing and spray drying. When a catalyst support or structure is coated therewith, coating and drying may be performed after washing, or coating may be performed after calcination, as will be described later.

The alumina-aluminum phosphate-mixed hydroxide thus obtained is dried and then calcined to form a catalyst for alkylating the terminal of polyalkylene glycol, which is in the form of an alumina-aluminum phosphate-mixed oxide [step (b)].

The alumina-aluminum phosphate-mixed hydroxide may be dried at 90 to 150° C. for 15 to 30 hr and then calcined through heating at a high temperature under an oxidizing atmosphere using air or an oxygen-containing gas mixture.

The calcination may be performed at a temperature of 500 to 700° C. for 5 to 30 hr. If the calcination conditions fall out of the above ranges, the catalytic form necessary for alkylating polyalkylene glycol is not obtained, undesirably deteriorating the catalytic activity.

The method of preparing the catalyst for alkylating the terminal of polyalkylene glycol according to the present invention enables the alkylation catalyst to be prepared in a manner that is environmentally friendly and economically feasible.

Still another aspect of the present invention addresses a method of alkylating the terminal of polyalkylene glycol, comprising reacting an alkylating agent and polyalkylene glycol in the presence of the above alkylation catalyst.

As the polyalkylene glycol that may be applied to the alkylation method of the present invention, any polyalkylene glycol may be used without limitation so long as it is a compound the terminal of which is substituted with a hydroxyl group, and examples thereof may include polyether polyol, allyl alcohol, alkylene oxide adducts, etc.

The alkylating agent, which may be applied to the alkylation method of the invention, may include environmentally friendly dialkyl carbonate, for example, dimethyl carbonate, diethyl carbonate, ethylmethyl carbonate, dipropyl carbonate, and methyl propyl carbonate. Preferably useful is dimethyl carbonate or diethyl carbonate.

The alkylating agent may be used in an amount of 10 to 44 mol based on 1 mol of polyalkylene glycol. If the alkylating agent is used in an amount of less than 10 mol based on 1 mol of polyalkylene glycol, the conversion rate of polyalkylene glycol is low. On the other hand, if the amount thereof exceeds 44 mol, the conversion rate of polyalkylene glycol is superior but decomposition of the alkylating agent may increase, undesirably negating economic benefits.

The alkylation of the present invention may be performed at a temperature ranging from 120 to 170° C. under a pressure ranging from atmospheric pressure to 3 $kgf/cm^2$. If the pressure exceeds the above range, the alkylation reactivity may decrease due to the high-pressure conditions in the reactor. Also, if the reaction temperature is lower than 120° C., alkylation reactivity may decrease, or many side reactions of polyalkylene glycol may occur. On the other hand, if the reaction temperature is higher than 170° C., the reactant, that is, polyalkylene glycol, may decompose during the reaction.

Also, the alkylation of the present invention may be carried out in a fixed-bed continuous manner. When this process is performed in a fixed-bed continuous manner, an appropriate amount of granular catalyst is loaded in the reactor, and reactants, for example, polyalkylene glycol and the alkylating agent, are continuously fed at the same time, and may thus continuously pass through the catalyst bed at a desired reaction temperature and a desired reaction pressure. The compound, passed through the reactor under conditions of appropriate reaction temperature and pressure, is separated and purified, and the unreacted polyalkylene glycol and alkylating agent may be recirculated.

The alkylation method of the present invention enables the terminal of polyalkylene glycol to be alkylated at a high conversion rate of 85% or more using an environmentally friendly alkylating agent, and may thus be useful in a variety of fields, including refrigeration oil for air conditioners for vehicles.

A better understanding of the present invention may be obtained through the following examples, which are merely set forth to illustrate, but are not to be construed as limiting the scope of the present invention.

Preparation Example 1

156 g of $Al(NO_3)_3 \cdot 9H_2O$ was added to 600 ml of distilled water and stirred, thus preparing a first alumina precursor aqueous solution, after which 28% aqueous ammonia was added to the first alumina precursor aqueous solution and stirred such that the pH of the first alumina precursor aqueous solution was 10.0, thus forming aluminium hydroxide. Separately, 238 g of $AlCl_3 \cdot 6H_2O$ was added to 1400 ml of distilled water and stirred, and 70 ml of 85% $H_3PO_4$ was further added, after which 28% aqueous ammonia was added and stirred such that the pH of the mixture of the second alumina precursor aqueous solution and phosphoric acid was 10.0, thus forming aluminum phosphate hydroxide.

The aluminium hydroxide and the aluminum phosphate hydroxide were mixed and stirred, after which 28% aqueous ammonia was added and stirred such that the pH thereof was 10.0, thus preparing an alumina-aluminum phosphate hydroxide. An alumina-aluminum phosphate hydroxide cake having the precipitated alumina-aluminum phosphate hydroxide was sufficiently washed with distilled water and isopropyl alcohol, and was then filtered using a filter press. The filtered alumina-aluminum phosphate hydroxide was dried at 110° C. for 24 hr, and was then calcined at 650° C.

for 24 hr, thereby yielding a catalyst for alkylating polyalkylene glycol containing 85 wt % of aluminum phosphate.

Preparation Example 2

156 g of $Al(NO_3)_3 \cdot 9H_2O$ was added to 600 ml of distilled water and stirred, thus preparing a first alumina precursor aqueous solution, after which 28% aqueous ammonia was added to the first alumina precursor aqueous solution and stirred such that the pH of the first alumina precursor aqueous solution was 10.0, thus forming aluminium hydroxide. An aluminium hydroxide cake having the precipitated aluminium hydroxide was sufficiently washed with distilled water and isopropyl alcohol, and was then filtered using a filter press. The filtered aluminium hydroxide was dried at 110° C. for 24 hr, and was then calcined at 650° C. for 24 hr, thereby yielding a catalyst for alkylating polyalkylene glycol.

Test Example 1

The structures of the catalysts of Preparation Examples 1 and 2 were analyzed through X-ray diffraction (XRD). Specifically, the XRD pattern of each catalyst was obtained at room temperature using an X-ray diffractometer (D/MAX 2500-V/PC, Rigaku) operating with Ni-filtered Cu-Kα radiation (λ=0.15418 nm) at 40 kV and 150 mA.

As shown in FIG. 1, the catalyst of Preparation Example 1 was identified to be a mixture of aluminum phosphate and alumina.

Figure 2:
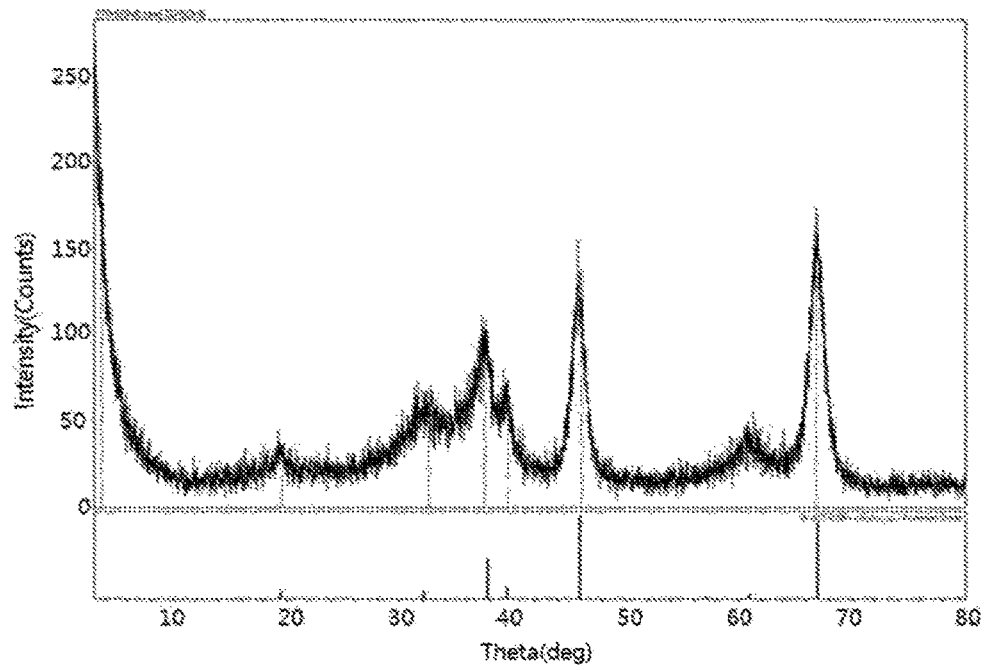
FIG. 2 is a graph showing the results of analysis of XRD of the catalyst of Preparation Example 2 according to the present invention.

As is apparent from the results of XRD of FIG. 2, the catalyst of Preparation Example 2 was confirmed to be alumina.

Example 1

A cylindrical continuous-type reactor having a diameter of 1 inch, a height of 30 cm and a volume of 200 cm$^3$ was packed with 100 cm$^3$ of the catalyst of Preparation Example 1, and glass balls were placed on the top and bottom of the packed catalyst so as to prevent the packed catalyst from escaping to the outside. The cylindrical continuous-type reactor was provided in a cylindrical electrical furnace equipped with a temperature controller, after which the cylindrical continuous-type reactor was heated to 145° C. and maintained at this temperature, and polyalkylene glycol (PAG P-65, NH Chemical) having a viscosity (40° C.) of 65 cSt and a weight average molecular weight of 1,300 g/mol and dimethyl carbonate (KPX Green) were passed through the catalyst bed for 72 hr in the amounts and at the velocities shown in Table 1 below, and were thus allowed to react. The resulting product was separated from unreacted dimethyl carbonate, methanol, and carbon dioxide using a separator at 120° C. and 30 torr.

Examples 2 to 8

The reaction was carried out in the same manner as in Example 1, using individual catalysts under the reaction conditions shown in Table 1 below.

Comparative Examples 1 to 4

The reaction was carried out in the same manner as in Example 1, using individual catalysts under the reaction conditions shown in Table 1 below. Al MCM 41 used in Comparative Examples 3 and 4 was purchased from Nankai University Catalyst Co., Ltd.

TABLE 1

| No. | PAG (wt part) | DMC (wt part) | DMC/PAG molar ratio | Catalyst | Space velocity (kg PAG/kg cat · hr) | Reaction temp. (° C.) | Reaction pressure (kgf/cm$^2$) | Conversion rate (%) | Methylation rate (%) |
|---|---|---|---|---|---|---|---|---|---|
| Ex. 1 | 100 | 75 | 10 | Prep. Ex. 1 | 0.05 | 145 | Atmospheric pressure | 99.4 | 93.0 |
| Ex. 2 | 100 | 100 | 15 | Prep. Ex. 1 | 0.05 | 135 | Atmospheric pressure | 99.4 | 96.2 |
| Ex. 3 | 100 | 100 | 15 | Prep. Ex. 1 | 0.05 | 145 | Atmospheric pressure | 88.1 | 95.6 |
| Ex. 4 | 100 | 100 | 15 | Prep. Ex. 1 | 0.10 | 130 | Atmospheric pressure | 99.4 | 92.4 |
| Ex. 5 | 100 | 100 | 15 | Prep. Ex. 1 | 0.10 | 145 | Atmospheric pressure | 98.8 | 93.1 |
| Ex. 6 | 100 | 300 | 44 | Prep. Ex. 1 | 0.05 | 145 | Atmospheric pressure | 94.3 | 85.5 |
| Ex. 7 | 100 | 100 | 15 | Prep. Ex. 2 | 0.05 | 145 | Atmospheric pressure | 98.7 | 94.9 |
| Ex. 8 | 100 | 100 | 15 | Prep. Ex. 2 | 0.05 | 135 | Atmospheric pressure | 94.4 | 87.4 |
| C. Ex. 1 | 100 | 50 | 8 | Prep. Ex. 1 | 0.05 | 145 | Atmospheric pressure | 83.6 | 69.0 |
| C. Ex. 2 | 100 | 100 | 15 | Prep. Ex. 1 | 0.05 | 145 | 5 | 75.0 | 63.0 |
| C. Ex. 3 | 100 | 300 | 44 | Al MCM 41* | 0.05 | 145 | Atmospheric pressure | 65.5 | 18.3 |
| C. Ex. 4 | 100 | 400 | 58 | Al MCM 41* | 0.05 | 145 | Atmospheric pressure | 75.0 | 13.2 |

PAG: polyalkylene glycol
DMC: dimethyl carbonate
Al MCM 41*: product available from Nankai University Catalyst Co., Ltd The conversion rate of the above reaction was calculated using the following Equation 1. The results are shown in Table 1. The hydroxyl value of polyalkylene glycol of Equation 1 was determined using the following analysis method. The analysis of the hydroxyl value of polyalkylene glycol is described below.

Specifically, blank measurement was performed in a manner in which magnetic bars were placed in a 250 ml flask, 5 ml of imidazole and 25 ml of 1.95 N phthalic anhydride were added, and the flask was sealed and gently stirred. Next, sample measurement was performed in a manner in which magnetic bars were placed in a 250 ml flask, 10 g of a sample was added, 5 ml of imidazole and 25 ml of 1.95 N phthalic anhydride were added, and the flask was sealed and gently stirred, as in the blank measurement. After stirring for 5 min, the flask for blank measurement and the flask for sample measurement were heated together in an oven at 100° C. for 50 min so as to allow them to react. After completion of the reaction, the flasks were cooled to room temperature. Thereafter, the liquid adhered to the wall of each of the flask for blank measurement and the flask for sample measurement was rinsed with 25 ml of pyridine. Thereafter, while 0.5 ml of 1% phenolphthalein pyridine solution was added and stirred, titration was carried out until the color was changed using a 0.5 N NaOH aqueous solution, thus measuring the titrated blank value and the titrated sample value.

The hydroxyl value was calculated using the following Equation 2. As such, imidazole was prepared by adding 56 g of 99% imidazole and 500 ml of pyridine in a 500 ml flask and performing stirring, and 1.95 N phthalic anhydride was prepared by adding 145 g of phthalic anhydride and 1 L of pyridine in a 1 L flask and performing stirring.

$$\text{Conversion rate } (\%) = \left(1 - \frac{\text{Hydroxyl value of } PAG \text{ after reaction}}{\text{Hydroxyl value of } PAG \text{ before reaction}}\right) \times 100 \quad \text{[Equation 1]}$$

$$\text{Hydroxyl value (mgKOH/g)} = \frac{(\text{Titrated blank value} - \text{titrated sample value}) \times 56.1 \times 0.5}{\text{Sample weight}} \quad \text{[Equation 2]}$$

The methylation rate was calculated using Equation 3 below. The results are shown in Table 1. The saponification value of Equation 3 was determined using the following analysis method. The saponification value is described below.

Magnetic bars were placed in a 100 ml flask, 10 g of a sample and 25 ml of a 0.5 N KOH aqueous solution were added and stirred, and ethanol was added until the solution became transparent. Next, the resulting solution was refluxed for 30 min using a Slidac transformer, a reflux condenser, and a stirrer, and was then cooled to room temperature. After cooling, the solution was added with two droplets of a 1% phenolphthalein ethanol solution, stirred, and titrated with a 0.5 N HCl aqueous solution, and the saponification value thereof was calculated using the following Equation 4.

The saponification value of Equation 4 is as follows.

$$\text{Methylation rate } (\%) = 100 \times \frac{\begin{bmatrix}\text{Hydroxyl value of } PAG \text{ before reaction} - \\ (\text{hydroxyl value of } PAG \text{ after reaction} + \\ \text{saponification value of } PAG \text{ after reaction})\end{bmatrix}}{[\text{hydroxyl value of } PAG \text{ before reaction}]} \quad \text{[Equation 3]}$$

$$\text{Saponification value (mgKOH/g)} = \frac{(\text{Titrated blank value} - \text{titrated sample value}) \times 56.1 \times 0.5}{\text{Sample weight}} \quad \text{[Equation 4]}$$

As is apparent from Table 1, when polyalkylene glycol was alkylated using the method of Examples 1 to 8, the hydroxyl conversion rate was 85% or more, and the methylation rate was 80% or more. However, in Comparative Examples 1 to 3, the hydroxyl value after methylation was 5 mg KOH/g or less, and thus the hydroxyl conversion rate was 85% or less and the methylation rate was 70% or less.

When comparing Comparative Example 3 with Example 6, the reaction conditions were the same, with the exception that Al-MCM41 was used in lieu of the catalyst of Preparation Example 1 according to the present invention, whereby the conversion rate was decreased from 94.3% to 75% and the methylation rate was decreased from 85.5% to 63%. In Comparative Example 4, even when the amount of dimethyl carbonate was increased to 400 parts by weight based on 100 parts by weight of polyalkylene glycol in the presence of Al-MCM41, the conversion rate and the methylation rate were only 75.0% and 32.5%, respectively.

In Examples 1 and 7, when dimethyl carbonate as the alkylating agent was used in amounts of 75 parts by weight and 100 parts by weight based on 100 parts by weight of polyalkylene glycol, which are lower than those of Comparative Examples 3 and 4, the reactivity of the invention was evaluated to be high. Hence, the catalyst of the invention can be found to be superior in terms of its ability to alkylate the terminal of PAG.

Comparative Examples 1 and 2 show the reactivity results when the DMC/PAG molar ratio is decreased and when the reaction pressure is increased, respectively. Through the comparative examples, appropriate ranges of the DMC/PAG molar ratio and the reaction pressure were found to be necessary.

The aforementioned embodiments of the present invention should not be to be construed to limit the technical spirit of the present invention. The scope of the present invention is limited only by the content set forth in the claims, and those skilled in the art will appreciate that various modifications and variations of the technical spirit of the invention are possible, without departing from the scope and spirit of the invention as disclosed in the accompanying claims.

INDUSTRIAL APPLICABILITY

The present invention pertains to an alkylation catalyst for alkylating the terminal hydroxyl group of polyalkylene glycol at a high conversion rate and to a method of alkylating the terminal of polyalkylene glycol, which enables polyalkylene glycol to be alkylated in an environmentally friendly and economical manner in the presence of the above alkylation catalyst, thus being industrially applicable.

The invention claimed is:

1. A method of preparing a catalyst for alkylating a terminal of polyalkylene glycol, comprising:
   (a-1) adding a precipitant to a first alumina precursor aqueous solution, thus forming aluminium hydroxide;
   (a-2) mixing a second alumina precursor aqueous solution and a phosphate precursor and then adding a precipitant, thus forming aluminum phosphate hydroxide;

(a-3) mixing the aluminium hydroxide of (a-1) with the aluminum phosphate hydroxide of (a-2) to form a hydroxide mixture, which is then added with a precipitant, thus forming an alumina-aluminum phosphate-mixed hydroxide; and (b) drying and then calcining the alumina-aluminum phosphate-mixed hydroxide.

2. The method of claim 1, wherein the phosphate precursor is at least one selected from the group consisting of phosphoric acid, orthophosphate, pyrophosphate, polyphosphate, metaphosphate, ultraphosphate, diammonium hydrophosphate, and ammonium dihydrophosphate.

3. The method of claim 1, wherein the phosphate precursor of (a-2) is mixed in an amount of 0.77 to 1.53 mol based on 1 mol of the second alumina precursor.

4. The method of claim 1, wherein the aluminum phosphate hydroxide of (a-3) is mixed in an amount of 0 to 5.9 mol based on 1 mol of the aluminium hydroxide.

5. The method of claim 1, wherein the first alumina precursor or the second alumina precursor is independently at least one selected from the group consisting of aluminum nitrate, sodium aluminate, potassium aluminate, aluminum chloride, aluminum sulfate, aluminum acetate, aluminum alkoxide, and trimethylaluminum.

6. The method of claim 1, wherein the precipitant is independently at least one selected from the group consisting of aqueous ammonia, sodium hydroxide, ammonium hydroxide, sodium carbonate, calcium carbonate, ammonium carbonate, and urea.

7. The method of claim 1, wherein the precipitant is added until a pH of the precursor aqueous solution is within a range from 9 to 11.

8. The method of claim 1, wherein (b) comprises performing drying at 90 to 150° C. for 15 to 30 hr and calcining at 500 to 700° C. for 5 to 30 hr.

9. A method of alkylating a terminal of polyalkylene glycol comprising reacting alkylating agent and polyalkylene glycol using the catalyst of claim 1.

10. A method of alkylating a terminal of polyalkylene glycol, comprising reacting dialkyl carbonate and polyalkylene glycol using a mixture of alumina and aluminium phosphate as a catalyst.

11. The method of claim 10, wherein the alkylating agent is reacted in an amount of 10 to 40 mol based on 1 mol of the polyalkylene glycol.

12. The method of claim 10, wherein the dialkyl carbonate and the polyalkylene glycol are allowed to react at a temperature of 120 to 170° C. under an atmospheric pressure to a pressure of 3 kgf/cm$^2$.

13. A method of alkylating a terminal end of polyalkylene glycol comprising reacting dialkyl carbonate with polyalkylene glycol using eta alumina as a catalyst.

14. The method of claim 13, wherein the dialkyl carbonate and the polyalkylene glycol are allowed to react at a temperature of 120 to 170° C. under an atmospheric pressure to a pressure of 3 kgf/cm$^2$.

15. A method of alkylating a terminal of polyalkylene glycol comprising reacting alkylating agent and polyalkylene glycol using a catalyst,
wherein the catalyst is prepared by a method comprising:
(a) adding a precipitant to a first alumina precursor aqueous solution, thus forming aluminium hydroxide; and
(b) drying and then calcining the aluminium hydroxide,
wherein, in step (a), the precipitant is added until a pH of the first alumina precursor aqueous solution is within a range from 9 to 11.

* * * * *